United States Patent
McBride et al.

[11] Patent Number: 5,854,943
[45] Date of Patent: Dec. 29, 1998

[54] SPEED EFFICIENT CACHE OUTPUT SELECTOR CIRCUITRY BASED ON TAG COMPARE AND DATA ORGANIZATION

[75] Inventors: John G. McBride, Fort Collins; Ted B. Ziemkowski, Loveland, both of Colo.

[73] Assignee: Hewlett-Packard Company, Palo Alto, Calif.

[21] Appl. No.: 689,173

[22] Filed: Aug. 7, 1996

[51] Int. Cl.$^6$ ........................................... G06F 15/02
[52] U.S. Cl. ................................. 395/871; 711/128
[58] Field of Search ............................. 711/128; 395/871

[56] References Cited

U.S. PATENT DOCUMENTS

| | | | |
|---|---|---|---|
| 5,014,195 | 5/1991 | Farrell et al. | 711/128 |
| 5,091,851 | 2/1992 | Shelton et al. | 711/128 |
| 5,353,424 | 10/1994 | Partovi et al. | 711/128 |
| 5,515,506 | 5/1996 | Dixon | 395/183.18 |
| 5,579,531 | 11/1996 | Sugita | 395/871 |
| 5,627,991 | 5/1997 | Hose, Jr. et al. | 711/129 |

OTHER PUBLICATIONS

Hennessy et al., "Computer Organization & Design: The Hardware/Software Interface", Morgan Kaufmann Publishers, Inc., ISBN 1–55860–281–X, pp. B–8 & B–30, 1994.

Mowle, Frederic J., "A Systematic Approach to Digital Logic Design", Addison–Wesley Publishing Company, Inc., ISBN 0–201–04920–1, pp. 131–132, 137 & 158, 1976.

*Primary Examiner*—Tod R. Swann
*Assistant Examiner*—Felix B. Lee

[57] ABSTRACT

A cache output selector for a multi-way set-associative cache memory which provides for simultaneous access of multiple-word data is presented. The cache memory comprises a plurality of data arrays wherein no two consecutive multiple-word reside in the same data. The cache output selector of the present invention includes, for each data array of the plurality of data arrays, a qualifying multiplexor which receives the respective tag match signals from each of the tag matching circuits as data input and a set selector signal, as selector input, and at least one qualifying signal as qualifying input. The set selector signal indicates which data array a first set of the multi-way set-associative memory resides in during a current read/write cycle. The qualifying multiplexor combines a clock qualifying functionality and a multiplexor functionality to produce a data array output enable signal in only two levels of logic. The cache memory comprises a prefetch buffer path and a bypass path from which the cache output selector selects an addressed multi-word for output. The output path selected circuit includes a pair of qualifying NOR gates. Each qualifying NOR gate combines a clock qualifying functionality and a logical NOR functionality to produce a qualified prefetch buffer path output enable signal and a qualified bypass path output enable signal respectively.

18 Claims, 14 Drawing Sheets

SPEED EFFICIENT CACHE OUTPUT SELECTOR CIRCUITRY BASED ON TAG COMPARE AND DATA ORGANIZATION

FIELD OF THE INVENTION

The present invention relates generally to a computer system which utilizes a multi-way set-associative cache memory, and more particularly, to an apparatus for providing speed-efficient tag-compare-to-cache-output selection.

BACKGROUND OF THE INVENTION

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time-required for the CPU to obtain instructions and operands from main memory, many computer systems include a cache memory between the CPU and main memory.

A cache memory is a small, high-speed buffer memory which is used to hold temporarily those portions of the contents of main memory which it is believed will be used in the near future by the CPU. The main purpose of a cache is to shorten the time necessary to perform memory accesses, either for data or instruction fetch. Cache memory typically has access times on the order of 5 to 10 times faster than a system's main memory. The use of cache memory can significantly improve system performance by reducing data access time, therefore requiring the CPU to spend far less time waiting for instructions and operands to be fetched and/or stored.

A cache memory is made up of many blocks (also called lines) of one or more words of data. Associated with each cache line in the cache is a tag. The tag provides information for mapping the cache line data to its main memory address. Each time the processor makes a memory reference, an address tag comparison is made to see if a copy of the requested data resides in the cache. If the desired memory block is not in the cache, the block is retrieved from the main memory, stored in the cache, and supplied to the processor. Commonly used mapping functions include direct mapping and associative mapping techniques.

In a multi-way set-associative cache a single index is used to simultaneously access a plurality of data arrays. A data array may be implemented by one or more physical random access memory integrated circuits. A set is a collection of all cache lines addressed by a single cache index. The number of data arrays addressed by a single cache index indicates the "way" number of a cache. For example, if in a cache a single cache index is used to access data from two data arrays, the cache is a two-way set-associative cache. Similarly, if in a cache a single cache index is used to access data from four data Arrays, the cache is a four-way set-associative cache.

When a multi-way access is made, a tag comparison is made for each data array. If a tag comparison indicates that the desired data block is in a particular data Array the operation is performed on/with data from that particular data array.

Typically, a cache allows the access of one word at a time. Many systems, however, implement functions performed on multiple-words, for example in floating point arithmetic functions. In order to access, for example, a two-word value it is necessary to make two cache memory accesses in a typical cache. In order to allow for a single cache memory cycle access of a two-word value, some prior art systems have doubled the output size and hence the number of data arrays (or random access memory integrated circuits) used in the implementation.

Multi-way set-associative cache memory addressing schemes have been developed to allow multiple-word access in a single read or write cycle. One such scheme is described in U.S. Pat. No. 5,091,851, to Shelton et al., whereby data is organized to place corresponding words of each line of data in different data arrays, and further, to place each word from each multiple word in different data arrays. In other words, the most significant word of each consecutive multiple-word resides in a different data array than its immediate successor or predecessor. The multiple-word accessing scheme of Shelton et al. requires a method for predicting which of the different data arrays contain the most significant word. It will be noted that each set of a multi-way set-associative cache resides in alternating data arrays during consecutive read/write cycles.

In addition to allowing multiple-word cache accesses during a single read/write cycle, some modern microprocessors also provide an increased data/instruction bus width to allow multiple multi-word data/instructions to be transferred from the cache to the CPU. This is often important, for example, to ensure that an instruction buffer within the CPU has an adequate supply of incoming instructions. By fetching instructions at a rate that is greater than or equal to that used to keep an instruction pipeline filled, instructions may be accumulated in register buffers of the CPU. The ability to do this reduces the number of wasted CPU cycles. In addition, multiple multi-word transfers between the cache and the CPU can be used to speed up multiple-word accesses in systems where multiple-word data would normally have to be accessed using multiple consecutive cycles. As an example, an instruction may comprise a double-word (64 bits), and the instruction bus width may accommodate 4 double-words (256 bits or more) in order to transfer 4 instructions from the cache to the CPU at once, and resulting in a transfer of four instructions in a single cycle rather than four consecutive cycles.

A set of pre-fetch buffers, also known as copy-in buffers, are often employed to store pre-fetched multiple-words until all of the multiple-words to be transferred are available and ready to be written into the cache.

In addition, a bypass path, in parallel with the pre-fetch buffers, is often used to quickly transfer the data currently being written to one of the pre-fetch buffers to the cache output. Such would occur, for example, when a pre-fetch buffer is being written to during a cycle in which the data is required at the output.

In a microprocessor system utilizing a multi-way set-associativities scheme for accessing multi-word data in a single read/write cycle, output control logic is employed to select the proper data array containing the requested multiple-word. Furthermore, in a cache memory system employing pre-fetch buffers or a bypass path, output control logic is employed to select the desired output path (i.e., between the data array outputs, the pre-fetch buffers, or the bypass path).

As previously mentioned, a tag comparison is made for each data array in a multi-way set-associative cache. If a tag comparison indicates the desired data block is in a particular data array the operation is performed on/with data from that particular data array.

Since two-bit comparisons of a large number of bits is a time-consuming process, the tag comparison is generally a critical path operation. Since the tag comparison is critical path, this magnifies the requirement that the tag-comparison-to-cache-output timing be minimized. Accordingly, a need exists for a speed efficient cache output selector which selects the output path in a minimum amount of time.

SUMMARY OF THE PRESENT INVENTION

Therefore, in accordance with the present invention, a speed-efficient system and method for cache output selection based on a tag compare output and data organization is presented. The cache output selector delays the inclusion of the tag match signals in the output logic as long as possible.

Presented herein is a cache output selector for a multi-way set-associative cache memory which provides for simultaneous access of multiple-word data. Such a cache memory comprises a plurality of data arrays wherein consecutive multiple-words reside in different data arrays. The cache output selector of the present invention includes, for each data array of the plurality of data arrays, a tag matching circuit for checking whether an addressed multiple-word resides in the data array and for producing a tag match signal to indicate whether the addressed multiple-word resides in the data array. The cache output selector further includes, for each data array of the plurality of data arrays, a qualifying multiplexor which receives the respective tag match signals from each of the tag matching circuits as data input and a set selector signal, a first clock signal, a second clock signal, and a qualifier signal as selector and qualifying inputs. The set selector signal indicates which data array a first set of the multi-way set-associative memory resides in during a current read/write cycle. The qualifying multiplexor combines a clock qualifying functionality and a multiplexor functionality to produce a data array output enable signal in only two levels of logic.

The qualifying multiplexor includes a plurality of transfer gates, one each corresponding to each tag match signal. Each transfer gate includes a transfer gate input for receiving an input signal, a transfer gate output to output an output signal, and a transfer gate control means to control whether the input signal received at the transfer gate input is transferred to the transfer gate output. Each transfer gate receives its corresponding tag match signal as its input signal. The qualifying multiplexor also includes a selector means responsive to the set selector signal for selecting one selected transfer gate from the plurality of transfer gates, and for signaling the transfer gate control means of the selected transfer gate to transfer its input signal to its transfer gate output to produce a selected transfer signal. The qualifying multiplexor further includes a NAND gate connected to receive the first and second clock signals and the qualifying signal. A NOR gate receives the selected transfer signal and the output of the NAND gate, and produces the data array output enable signal.

The cache memory may further comprise a prefetch buffer path and/or a bypass path from which the cache output selector may select an addressed multi-word for output. In this case, the cache output selector of the present invention further includes a pair of NAND gates each followed by a qualifying NOR gate. A first NAND gate receives the respective tag match signals from each of the tag matching circuits and a prefetch path selection signal. The output of the first NAND is received at the data input of a first qualifying NOR circuit. The first qualifying NOR circuit also receives a first clock signal, a second clock signal, and a qualifier signal. A second NAND gate receives the respective tag match signals from each of the tag matching circuits and a bypath path selection signal. The output of the second NAND is received at the data input of a second qualifying NOR circuit. The second qualifying NOR circuit also receives a first clock signal, a second clock signal, and a qualifier signal. Each of the first qualifying NOR gate and said second qualifying NOR gate combine a clock qualifying functionality and a logical NOR functionality to produce a speed-critical prefetch buffer path output enable signal and a speed-critical bypass buffer path output enable signal respectively in only level of logic.

Each qualifying NOR gate includes a NAND gate connected to receive the first and second clock signals and the qualifying signal. A NOR gate receives a data input and the output of the NAND gate to produce a qualified NOR signal. The qualifying NOR gate is used in the cache output selector of the present invention to generate a prefetch buffer path output enable signal or bypass path output enable signal respectively.

An alternative embodiment for the qualifying multiplexor is implemented using a plurality of qualifying NOR gates, one each corresponding to and receiving each tag match signal at its data input, and each also receiving a qualifying signal at its qualifier input. Each NOR gate produces a set enable output signal.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings, of which.

DETAILED DESCRIPTION OF THE INVENTION

Figure 1:
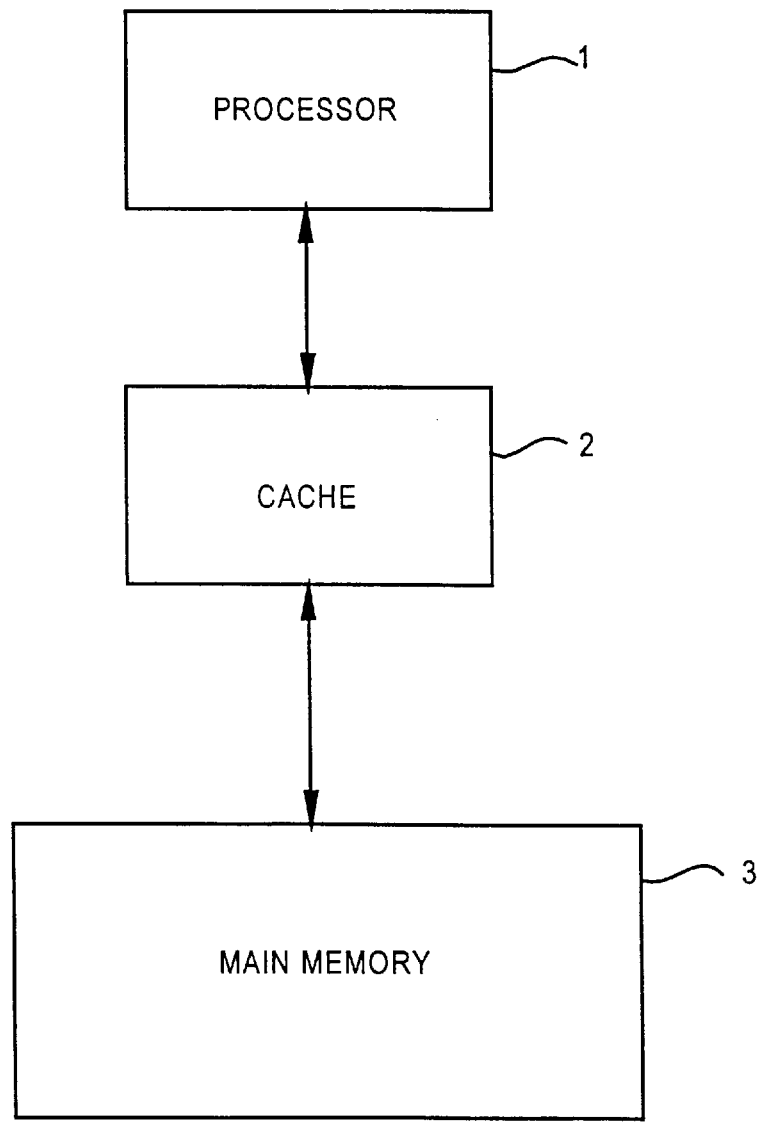
FIG. 1 is a block diagram of a processor in which the present invention operates.

In FIG. 1, a processor 1 utilizes data stored in a main memory 3. In order to increase the rate at which processor 1 accesses data from main memory 3, a cache 2 is utilized. Cache 2 is a cache into which multiple-word data may be written or from which data may be read in a single cache access cycle.

Figure 2:
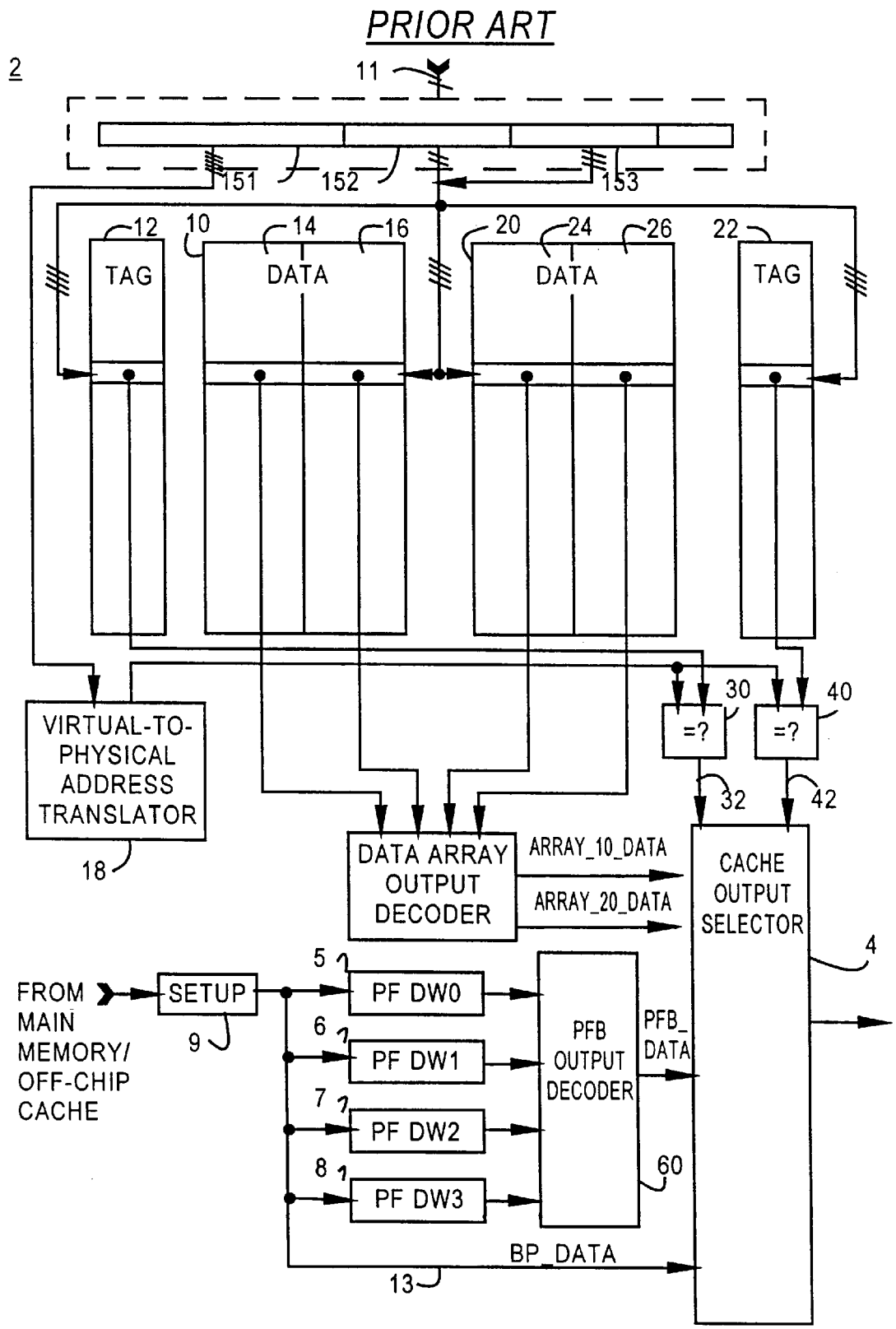
FIG. 2 is a block diagram of a cache memory in accordance with the present invention.

In FIG. 2, cache 2, in accordance with the preferred embodiment of the present invention, is shown. Cache 2 is a two-way set-associative cache which includes a data array 10, a data array 20, a tag array 12, and a tag array 22. As shown in FIG. 2, data array 10 is divided into a left data array 14 and a right data array 16, and data array 20 is divided into a left data array 24 and a right data array 26. These two arrays 10 and 20 are logically identical.

In the preferred embodiment, each data array 10, 20 is implemented with a 32K byte random access memory. The cache 2 holds 1024 cache lines, where each cache line comprises 4 double-words and each double-word comprises 64 bits. Accordingly, there are 256 bits of data in one cache line. In the preferred embodiment, each double-word includes an additional 8 bits for instruction pre-decode and additional 8 bits for parity checking.

Figure 3:
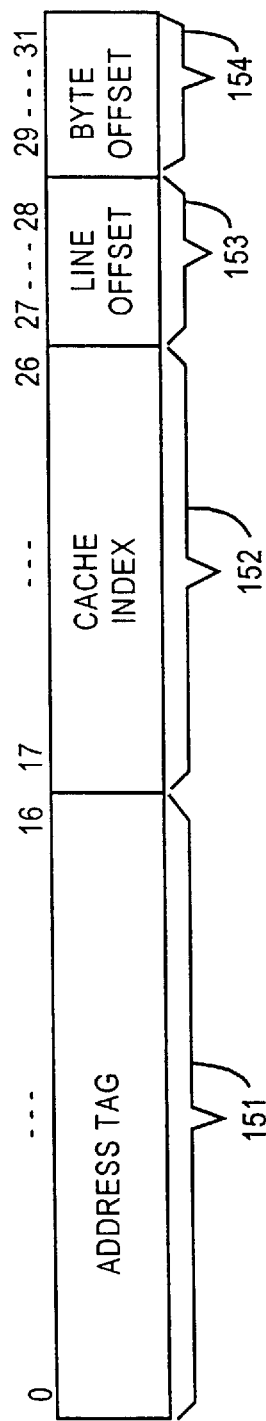
FIG. 3 is a logical diagram of a requested address.

When processor 1 desires to read data from cache 2, processor 1 places a read address of data to be read on lines 11. A typical organization for an address is shown in FIG. 3, which depicts the address organization of a requested address from cache 2 of the preferred embodiment shown in FIG. 2. An address 150 is composed of, for example, 32 bits. Bits 0–19 are used as an address tag 151. Bits 17–26 are used as a cache index 152. Bits 27–28 are used as a line offset 153. Bits 29–31 are used as a byte offset 154. In the preferred embodiment, data is comprised of 32-bit words which are addressable in double-words only (i.e. 8 bytes at a time), and accordingly, the least significant bits 29–31 are ignored. In addition, in the preferred embodiment, the address tag 151 contains the virtual address of the requested address. Because the address is virtually indexed, the address tag 151 and the cache index 152 may have overlapping bits (bits 17–19 in the preferred embodiment) to distinguish the requested address of a current process from addresses of other concurrently running processes.

Logically, as shown in FIG. 2, the cache index 152 (bits 17–26) is used as the index into each tag array 12, 22. The value of the cache index 152 is used to select the tag with which to compare to the requested address on lines 11 using tag match comparison circuitry 30,40. Tag match comparison circuitry is known in the art. Tag match comparison circuitry may be implemented in various ways. A simple scheme may include an n-bit comparator for each set of the cache for comparing the contents of the tag in tag array 12,22 indexed by the cache index 152 with the contents of the address tag 151, where n is the number of bits in the address tag 151. As shown in FIG. 2, since the preferred embodiment is virtually indexed and physically tagged, the address tag 151 contains a virtual address of the requested double-word, and therefore must first be converted into a physical address by a virtual-to-physical address translator 18 before being compared with the contents of the tag arrays 12,22.

If one of the comparator outputs 32, 42 indicates that a match was found, a "hit" has occurred, indicating that the data corresponding to the requested address is contained in the corresponding data array 10, 20. Thus, if the tag of a cache line in a set matches the requested address tag 151 (or an address derived from the requested address tag 151, as in the case of the preferred embodiment where the contents of the address tag 151 are converted from a virtual address to a physical address), then the tag match circuit 30, 40 corresponding to that set signals a hit on its respective output line 32, 42.

If the current operation is a write rather than a read, the address tag 151 is written into the selected tag array 12 or 22. In the preferred embodiment, the addresses contained in the tag arrays 12, 22 are translated from virtual-to-physical before being entered into the tag array. The complexities of writing to the data arrays 10, 20 and tag arrays 12, 22 are beyond the scope of this disclosure and are not addressed herein.

As shown in FIG. 2, the cache index 152 is also logically used as the index into each data array 10, 20. The line offset 153 selects the requested double-word from four double-words in a set. An array output decoder 44 receives the data contained in data arrays 10, 20 indexed by cache index 152 and, using the line offset 153 as a select signal, selects a single double-word from among four double-words for each set. The array output decoder 44 produces two data outputs, ARRAY_10_DATA, ARRAY_20_DATA. ARRAY_10_DATA is the selected double-word coming from data array 10, and ARRAY_20_DATA is the selected double-word coming from data array 20.

FIG. 2 also shows that the cache 2 includes a set of four pre-fetch buffers 5–8. Data written into the cache 2 from main memory or an off-chip cache is written four double-words at a time. Thus, the pre-fetch buffers will each generally receive and store a single double-word. When all four pre-fetch buffers 5–8 are full, the contents are transferred to the data arrays 10, 20 all at once. The cache 2 of FIG. 2 in the preferred embodiment utilizes a setup register 9 which is clocked, for example, by a clock 1 non-overlapping signal CK1N in order to latch valid data coming from main memory during the evaluate phase of CK1N. The pre-fetch buffers 5–8 are generally clocked, for example, by a differential non-overlapping clock signal CK2N in order to receive the data from the setup register 9 during the CK2N evaluate phase (i.e., during the CK1N pre-charge phase), thereby preventing signal races in latch-to-latch transfers.

Occasionally the cache 2 may receive a request for an address which is currently being written into one of the pre-fetch buffers 5–8 from main memory for subsequent writing into the cache 2. In this instance, a bypass path 13, implemented by a direct line in parallel with the pre-fetch buffers 5–8, is often employed to further increase cache output efficiency. Thus, as shown in the preferred embodiment in FIG. 2, the bypass path 13 is a direct line connecting the output of the setup register 9 to the cache output selector 4.

The cache output selector 4 may receive the data outputs ARRAY_10_DATA, ARRAY_20_DATA, and the selected pre-fetch buffer data output PFB_DATA, and/or the bypass path data BP_DATA if implemented. The cache output selector 4 selects one of the input data for output on cache output line OUT.

Figure 4:
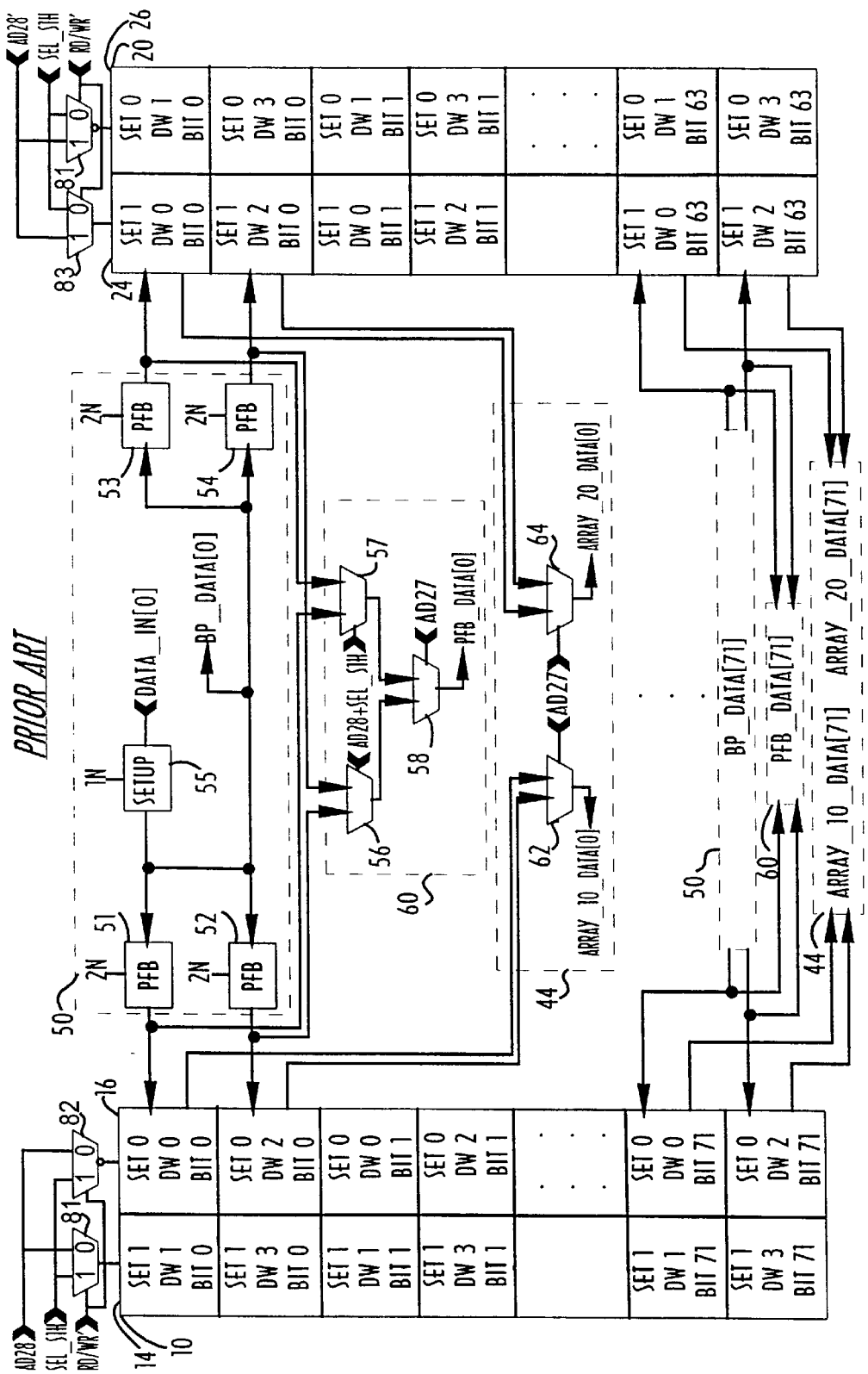
FIG. 4 is a block diagram of a cache memory used in the preferred embodiment of the present invention.

FIG. 4 illustrates the preferred embodiment of cache 2, in which corresponding bits of each double word are grouped together in each data array (which are logically equivalent). As shown in FIG. 4, a pre-fetch buffer bit circuit 50, a pre-fetch buffer output decoder circuit 60, and a data array output decoder circuit exist for each data bit to be output. Each pre-fetch buffer bit circuit 50 includes a set of four pre-fetch buffer bit latches 51–54, each corresponding to a single bit of pre-fetch buffers 5–8 of FIG. 2, and a staging register bit latch 55 corresponding to a like single bit of setup register 9 of FIG. 2.

Selection of either the left array 14 or right array 16 of data array 10 is performed differently depending on whether the current cycle is a read or a write cycle. If the current cycle is a read, address bit 28 $AD_{28}$ of line offset 153 in the preferred embodiment physically selects 35 which data array 10 or 20 contains set 0 and which one contains set 1. As shown in FIG. 4, the value of $AD_{28}$ indicates (1) which of data array 10 or data array 20 set 0 is currently in; and (2) whether the requested address is an even double-word or an odd double-word (i.e., whether the line offset is even or odd). If the current cycle is a write, however, a write control signal SEL_S1H which is generated by a cache controller circuit (not shown) is used to indicate whether the left array 14 or right array 16 of data array 10 pre-fetch buffers 51, 52 will be written into, and whether the left array 24 or right array 26 of data array 20 pre-fetch buffers 53, 54 will be written into. The double-words of a single set are written into the cache 2 all at one. In the preferred embodiment, the write control signal SEL_S1H is high when set 1 is to be written and is low when set 0 is to be written.

Since the left/right data array select signals are different depending whether a read or a write to the data arrays 10, 20 are being performed, the preferred embodiment utilizes a set of left/right data array multiplexors 81–84, one each for selecting left data array 14, right data array 16, left data array 24, and right data array 26, and each of which receives a read/write signal RD/WR' as a select signal. As shown in FIG. 4, each left/right data array multiplexor 81–84 receives either non-inverted or inverted address bit $AD_{28}$ and the write control signal SEL_S1H. Left/right data array multiplexors 81 and 82 receive non-inverting address bit $AD_{28}$ and left/right data array multiplexors 83 and 84 receive inverting address bit $AD_{28}$. Left/right data array multiplexors 81, 83 are non-inverting multiplexors and left/right data array multiplexors 82, 84 are inverting multiplexors. Thus, as shown in FIG. 4, on a read cycle multiplexors 81–84 select non-inverting or inverting address bit $AD_{28}$ to be used as a select signal for their respective left or right data arrays 14, 16, 24, 26. On a write cycle, multiplexors 81–84 select write control signal SEL_S1H as select signals.

As also shown in FIG. 4, each pre-fetch buffer output decoder circuit 60 includes a plurality of double-word selector multiplexors 56, 57, one each corresponding to each data array. Thus, since there are two arrays in the preferred embodiment, each pre-fetch buffer output decoder circuit 60 includes two double-word selector multiplexors 56, 57. The double-word selector multiplexor 56 is connected to receive the signals on lines 72 and 74 from the output of pre-fetch buffers 52 and 54 respectively. The double-word selector multiplexor 57 is connected to receive the signals on lines 71 and 73 from the output of pre-fetch buffers 51 and 53 respectively. The double-word selector multiplexors 56, 57 are controlled by the result of an exclusive OR of write control signal SEL_S1H (or a signal derived from it) and address bit $AD_{28}$ of the line offset 153. Each pre-fetch buffer output decoder circuit 60 also includes a second-level double-word selector multiplexor 58 which selects between the two selected double-words of double-word selector multiplexors 56, 57. In the preferred embodiment, the second-level double-word selector multiplexor 58 is controlled by address bit $AD_{27}$ of the line offset 153.

The array output decoder circuit 44 shown in FIG. 4 includes a plurality of data array output multiplexors 62, 64, one corresponding to each data array 10, 20. In the preferred embodiment shown in FIG. 4, data array output multiplexor 62 receives data present on lines 77 and 78 as determined by address bit $AD_{28}$. Similarly, data array output multiplexor 64 receives data present on lines 79 and 80 as determined by address bit $AD_{28}$. If $AD_{28}$ is low, then data array 10 has set 0 and data array 20 has set 1, and the requested address is an even double-word (i.e., double-word 0 or 2). Data array output multiplexor 62 receives set 0 double-word 0 bit 0 on line 77 and set 0 double-word 2 bit 0 on line 78, and data array output multiplexor 64 receives set 1 double-word 0 bit 0 on line 79 and set 1 double-word 2 bit 0 on line 80. If $AD_{28}$ is high, then data array 10 has set 1 and data array 20 has set 0, and the requested address is an odd double-word (i.e., double-word 1 or double-word 3). Data array output multiplexor 62 receives set 1 double-word 1 bit 0 on line 77 and set 1 double-word 3 bit 0 on line 78, and data array output multiplexor 64 receives set 0 double-word 1 bit 0 on line 79 and set 0 double-word 3 bit 0 on line 80. Data array output multiplexor 62 is controlled by select signal address bit $AD_{27}$, which selects between set 0 double-word 0 bit 0 and set 0 double-word 2 bit 0 when $AD_{28}$ is low, and between set 1 double-word 1 bit 0 and set 1 double-word 3 bit 0 when $AD_{28}$ is high. The selected data is output on signal ARRAY_10_DATA. Similarly, data array output multiplexor 64 is also controlled by select signal address bit $AD_{27}$, which selects between set 1 double-word 0 bit 0 and set 1 double-word 2 bit 0 when $AD_{28}$ is low, and between set 0 double-word 1 bit 0 and set 0 double-word 3 bit 0 when $AD_{28}$ is high. The selected data is output on signal ARRAY_20_DATA.

The above-described cache structure allows one double-word to be read from the cache 2 in a single read cycle, rather than in two consecutive read cycles as it is conventionally done. Because only half of each set is read during each read cycle, it is clear that the data array 10, 20 containing set 0 alternates for consecutive double-words. Similarly, the data array 10, 20 containing set 1 also alternates for consecutive double-words. It is apparent, therefore, that the cache output selector 4 of FIG. 2 must perform data array output selection decoding. In addition, if cache 2 includes pre-fetch buffers 5–8 for writing data into the cache 2 and/or a bypass path 13 as described previously, the cache output selector 4 must also include output path selection decoding.

Figure 5:
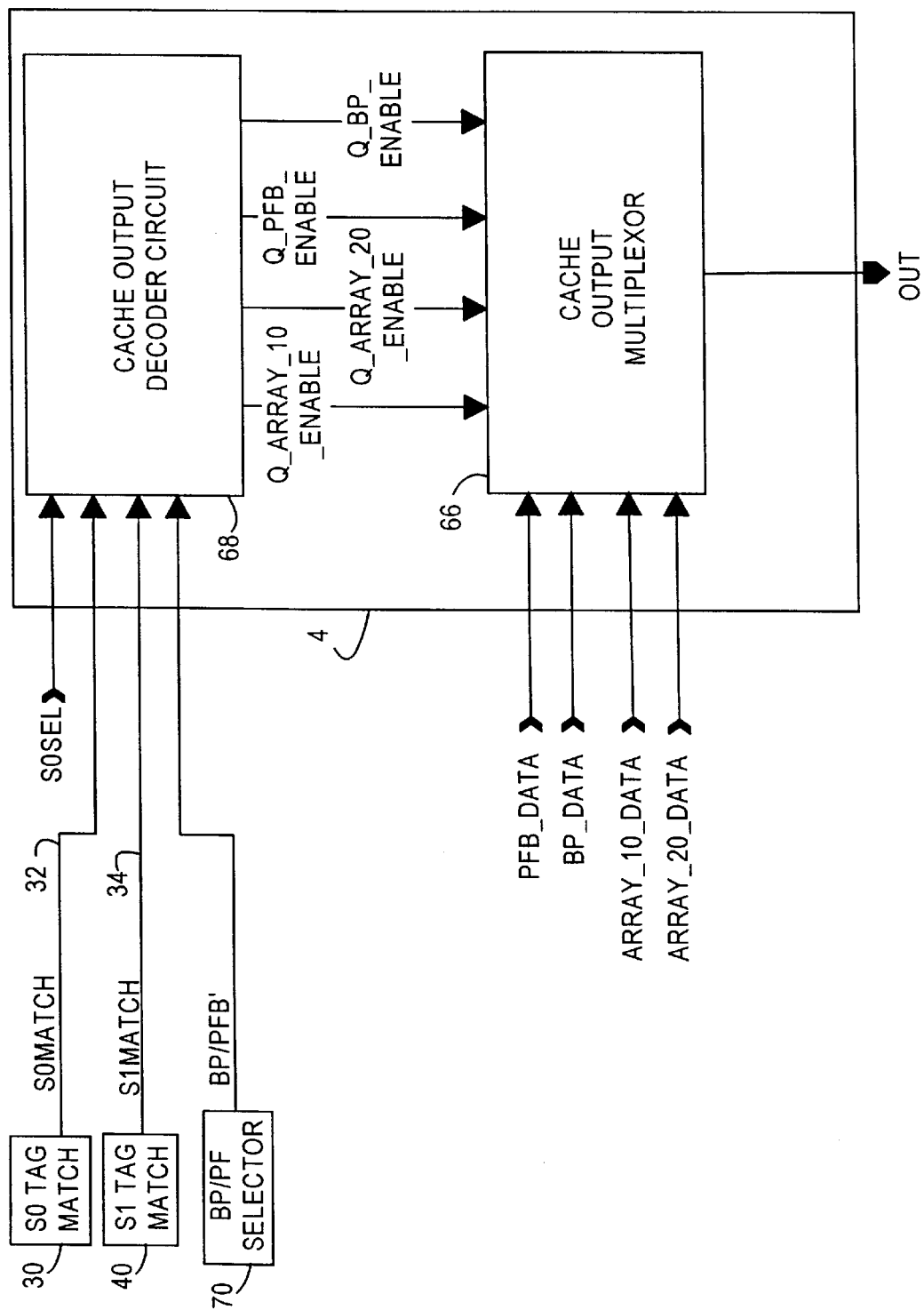
FIG. 5 is a block diagram of the output paths required for cache output selection in the preferred embodiment.

FIG. 5 is a block diagram of the cache output selector 4 of the preferred embodiment. As shown in FIG. 5, the cache output selector 4 receives a set of double-word inputs PFB_DATA, BP_DATA, ARRAY_10_DATA, ARRAY_20_DATA. Each bit of the respective inputs PFB_DATA, BP_DATA, ARRAY_10_DATA, ARRAY_20_DATA are generated respectively by the plurality of pre-fetch buffer bit output decoders 60, the bypass path 13, and the plurality of data array bit output decoders 44. The data inputs are received by a cache output multiplexor/latch 66 within the cache output selector 4. The cache output multiplexor/latch 66 also receives several select inputs, Q_ARRAY_10_ENABLE, Q_ARRAY_20_ENABLE, Q_PFB_ENABLE, Q_BP_ENABLE, generated by a cache output decoder circuit 68 within the cache output selector 4 from which the cache output multiplexor determines which of the data inputs should be selected for output. The cache output decoder circuit 68 receives a set selector signal S0SEL which indicates which of data array 10 or data array 20 set 0 resides in during the current read/write cycle. In the preferred embodiment, S0SEL is high (logical 1) when set 0 resides in data array 10, and is implemented using the complement of address bit $AD_{28}$ of the line offset 153 of the requested address.

The cache output decoder circuit 68 also receives a bypass/pre-fetch buffer signal BP/PFB' which is generated by a bypass/pre-fetch select circuit 70. The bypass/pre-fetch buffer signal BP/PFB' in the preferred embodiment is high (logical 1) when the bypass path is selected and is low (logical 0) when the pre-fetch buffer path is selected. The bypass/pre-fetch select circuit 70 defaults to selecting the pre-fetch buffer path PFB (i.e., bypass/pre-fetch buffer signal BP/PFB' is low) unless it detects that the requested data is currently being written to a pre-fetch buffer 51–54 during a cycle in which it is requested to be read.

The cache output decoder circuit 68 also receives tag match signals S0MATCH and S1MATCH respectively from a set 0 tag compare circuit 30 and a set 1 tag compare circuit 40. Tag compare circuits are known in the art and comprise multiple-bit comparators. Accordingly, it is not known whether a tag match was hit unless the TAG_MATCH_VALID signal is high. If both tag match signals S0MATCH, S1MATCH go low when TAG_MATCH_VALID is high, this indicates that the requested address is not in the cache 2, and the cache output decoder circuit 68 defaults to selecting the bypass/prefetch buffer path. The tag match signals S0MATCH and S1MATCH must be qualified using non-overlapping clock signals to prevent signal races between transparent latches and to detect cache misses. This qualification is accomplished by AND gates 622–628.

Figure 6:
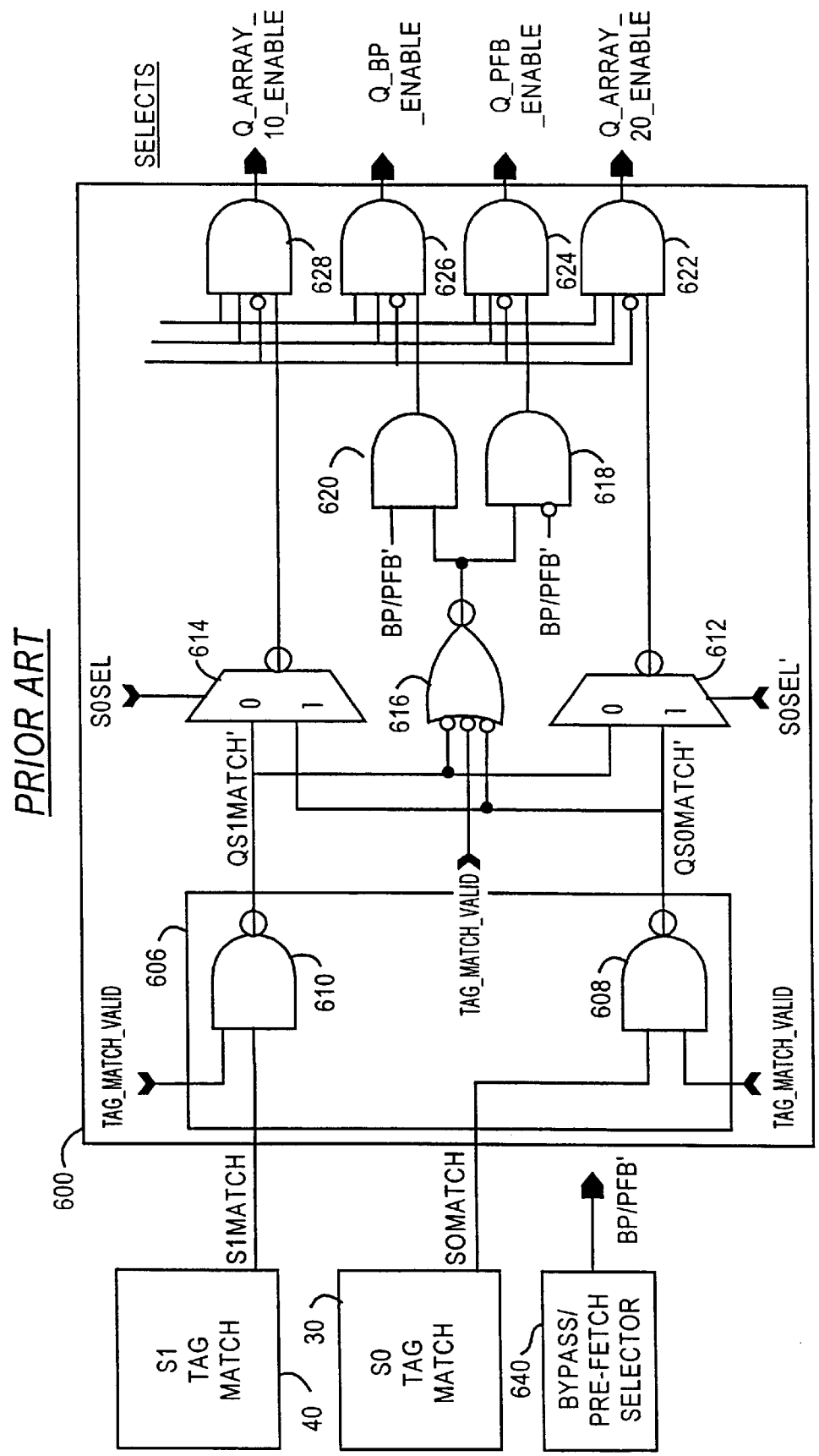
FIG. 6 is a logic schematic of the required logic for a cache output selector for the cache memory of FIGS. 2 and 4 which the present invention overcomes.

FIG. 6 is a schematic block diagram of the logic required for a cache output selector 600 for a cache having 2-way associativity (sets 0 and 1), a set of prefetch buffers and a bypass path as described above with respect to FIG. 2. As shown in FIG. 6, the cache output selector 600 receives tag match signals S0MATCH and S1MATCH as input. The tag match signals S0MATCH and S1MATCH are generated by respective tag comparison circuits 30 and 40. In order to ensure detection of cache misses, the respective raw tag match signals S0MATCH and S1MATCH are qualified by tag match signal qualifier circuit 606, which generates qualified tag match signals QS0MATCH' and QS1MATCH' based on the raw tag match signals S0MATCH, S1MATCH and a qualifier signal TAG_MATCH_VALID which only goes high when S0MATCH and S1MATCH are valid. Signal qualification using the qualifier signal TAG_MATCH_VALID is necessary to prevent drive fights and unwanted signal transitions. The generation of the qualifier signal TAG_MATCH_VALID is complex due to the uncertainty between the latest time the tag match signals S0MATCH, S1MATCH could be valid and the time that TAG_MATCH_VALID can be guaranteed to be valid. Thus, the circuit for generating the TAG_MATCH_VALID signal must guarantee that the uncertainty period for the tag match signals S0MATCH, S1MATCH and the high period for the qualifier signal TAG_MATCH_VALID are non-overlapping, resulting in a deadtime between when the tag match signals S0MATCH, S2MATCH are really valid and when the TAG_MATCH_VALID signal indicates that they are valid. Accordingly, the overall circuit for qualifying the tag match signals is slow due to the deadtime.

The tag match signal qualifier circuit 606 includes respective NAND gates 608, 610. NAND gate 608 receives the raw tag match signal S0MATCH and a the qualifier signal TAG_MATCH_VALID. NAND gate 610 receives the raw tag match signal S1MATCH and the qualifier signal TAG_MATCH_VALID. The output of NAND gate 608 produces qualified tag match signal QS0MATCH', and the output of NAND gate 610 produces qualified tag match signal QS1MATCH'.

FIG. 6 also shows that the cache output selector 600 employs inverting data array multiplexor 612 and inverting data array multiplexor 614, each of which receive the qualified tag match signals QS0MATCH' and QS1MATCH' as input. Inverting data array multiplexor 612 receives the inverted select signal S0SEL'. The inverted select signal S0SEL' is used to select which qualified tag match signals QS0MATCH' and QS1MATCH' received at the input of inverting data array multiplexor 612 will be output by the inverting data array multiplexor 612. Inverting data array multiplexor 614 receives a select signal S0SEL which signifies which data array 10, 20 set 0 is currently in. The select signal S0SEL is used to select which qualified tag match signals QS0MATCH' and QS1MATCH' received at the input of inverting data array multiplexor 614 will be output by the inverting data array multiplexor 614.

In FIG. 6, if select signal S0SEL is high, then set 0 is located in data array 10, and set 1 is located in data array 20. Thus, with reference to FIG. 6, for example, inverting data array multiplexor 612 will select the qualified tag match signal QS1MATCH' and inverting data array multiplexor 614 will select the qualified tag match signal QS0MATCH' if select signal S0SEL is high. If set 0 hit, qualified tag match signal QS0MATCH' will be low and qualified tag match signal QS1MATCH' will be high. Thus, the output of inverting data array multiplexor 612 will be low, indicating that the cache output will not come from data array 20, and the output of inverting data array multiplexor 614 will be high, indicating that the cache output will come from data array 10.

If instead set 1 hit, qualified tag match signal QS0Match' will be high and qualified tag match signal QS1Match' will be low. Thus, the output of inverting data array multiplexor 612 will be high, indicating that the cache output will come from data array 20, and the output of inverting data array multiplexor 614 will be low, indicating that the cache output will not come from data array 10.

If neither set hits, the outputs of both inverting data array multiplexors 612, 614 will be low, indicating that the cache output will not come from either data array 10, 20.

The cache output selector 600 of FIG. 6 also includes a NOR gate 616 with inverting inputs (also known as an AND gate by those skilled in the art), and AND gates 618 and 620. The NOR gate 616 with inverting inputs receives the qualified tag signals QS0Match', QS1Match' and the qualifier signal TAG_MATCH_VALID, inverts them, and performs a logical NOR operation. Since qualified tag signals QS0Match' and QS1Match' are both low (logical 0) if respective sets 0 and 1 hit, the output of the NOR gate 616 is high (logical 1) only if both sets missed and the qualifier signal TAG_MATCH_VALID indicates that the qualified tag match signals are valid. AND gate 618 receives the output of NOR gate 616 and an inverted bypass/pre-fetch buffer select signal BP/PFB' which is high (logical 1) when the bypass path is to be selected and low (logical 0) when the pre-fetch buffer path is to be selected. Thus, the output of AND gate 618 is high whenever the pre-fetch buffer path is to be selected as the cache output. AND gate 620 receives the output of NOR gate 616 and the bypass/pre-fetch buffer select signal BP/PFB'. The output of AND gate 620 is thus high whenever the bypass path is to be selected as the cache output.

The cache output selector 600 of FIG. 6 also includes AND gates 622, 624, 626, 628, each of which receive a non-overlapping clock signal CK1N, overlapping clock signal CK2, a qualifier signal QUAL, and the outputs of inverting data array multiplexor 612, AND gate 618, AND gate 620, and inverting data array multiplexor 614, respectively. AND gates 622, 624, 626, 628 ensure that no signal races occur by qualifying the output signals with the non-overlapping clock signals CK1N, CK2, and a qualifier signal QUAL. The qualifier signal QUAL may be used for several purposes, as for example, a test mode input to disable cache output to allow test data to be written to and then out of the output latch. The outputs of AND gates 622, 624, 626, 628 are qualified enable signals Q_ARRAY_10_ENABLE, Q_ARRAY_20_ENABLE, Q_PFB_ENABLE, Q_BP_ENABLE.

The logic required for the cache output selector 600 as shown in FIG. 6 is too slow for the requirements of modern systems. As described previously, the qualifier signal TAG_MATCH_VALID is difficult to generate and slows down the tag-compare-to-output timing. However, tag-compare-to-cache-output timing is very important to system performance because the tag compare path is critical. Therefore, a need exists for reducing the time required to perform the logical function of the cache output selector 600 of FIG. 6, while also maintaining the same timing between the falling edge of first clock signal CK1N, the rising edge of second clock signal CK2, and the falling edge of second clock signal CK2 in order to avoid signal races for upstream and downstream logic.

Figure 7:
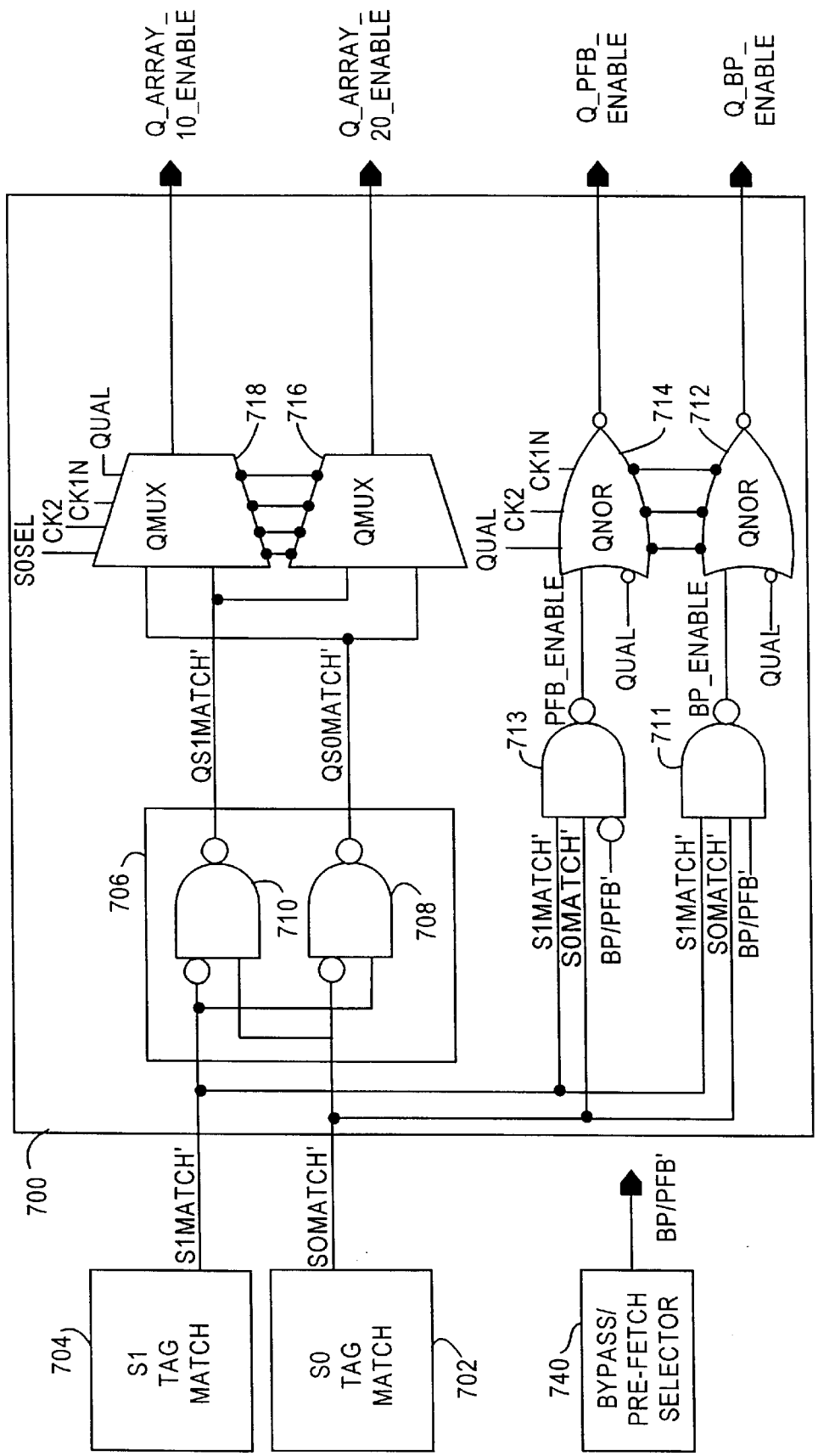
FIG. 7 is a logic schematic of a cache output selector in accordance with the present invention which provides an improved speed-efficient solution to the required logic of FIG. 6.

FIG. 7 is a block diagram of a cache output selector 700 in accordance with the present invention which meets the performance requirements and maintains the timing of a such a system. As shown in FIG. 7, inclusion of the tag match signals S0MATCH' and S1MATCH' in the cache output selector logic 700 are delayed by implementing self-timed signal qualification, and consequently eliminating the need for the qualifier signal TAG_MATCH_VALID and several levels of logic as required in the implementation of FIG. 6. As described previously, signal qualification using non-overlapping clock signals is necessary to prevent races between transparent latches. In addition, the cache output selector 700 combines the multiplexing function of the inverting data array multiplexors and the qualifying AND gates of the data array output path.

As shown in FIG. 7, the cache output selector 700 of the preferred embodiment of the present invention receives tag match signals S0MATCH' and S1MATCH' as input. The tag match signals S0MATCH' and S1MATCH' are generated by respective tag comparison circuits 702 and 704. The tag match signals S0MATCH' and S1MATCH' pre-charge low (logical 0), so a tag match is detected only if one tag comparison circuit 702, 704 signals a miss by raising its respective tag match signal S0MATCH', S1MATCH' high (logical 1). In order to ensure detection of cache misses, the respective raw tag match signals S0MATCH' and S1MATCH' are qualified and ensured valid using a self-timed tag match signal qualifier circuit 706. The self-timed tag match signal qualifier circuit eliminates the qualifier signal TAG_MATCH_VALID as required in the tag match signal qualifier circuit 606 of FIG. 6, and therefore eliminates the need for a complex and slow circuit for generating the qualifier signal TAG_MATCH_VALID. The self-timed tag match signal qualifier circuit 706 generates qualified tag match signals QS0MATCH' and QS1MATCH'. In the data array output path, qualification of the output signal is deferred until later in the data array output path. As described hereinafter, signal qualification using a non-overlapping clock signal is combined with the multiplexing of the tag match signals in a qualified multiplexor circuit 716, 718.

The self-timed tag match signal qualifier circuit 706 of the preferred embodiment includes respective 2-input NAND gates 708, 710, rather than the NAND gates 608, 610 of tag match signal qualifier circuit 606 of FIG. 6. NAND gate 708 receives the raw tag match signal S1MATCH' and the inverted raw tag match signal S0MATCH', and NAND gate 710 receives the raw tag match signal S0MATCH' and inverted raw tag match signal S1MATCH'. The output of NAND gate 708 produces qualified tag match signal QS0MATCH', and the output of NAND gate 710 produces qualified tag match signal QS1MATCH'.

Figure 8:
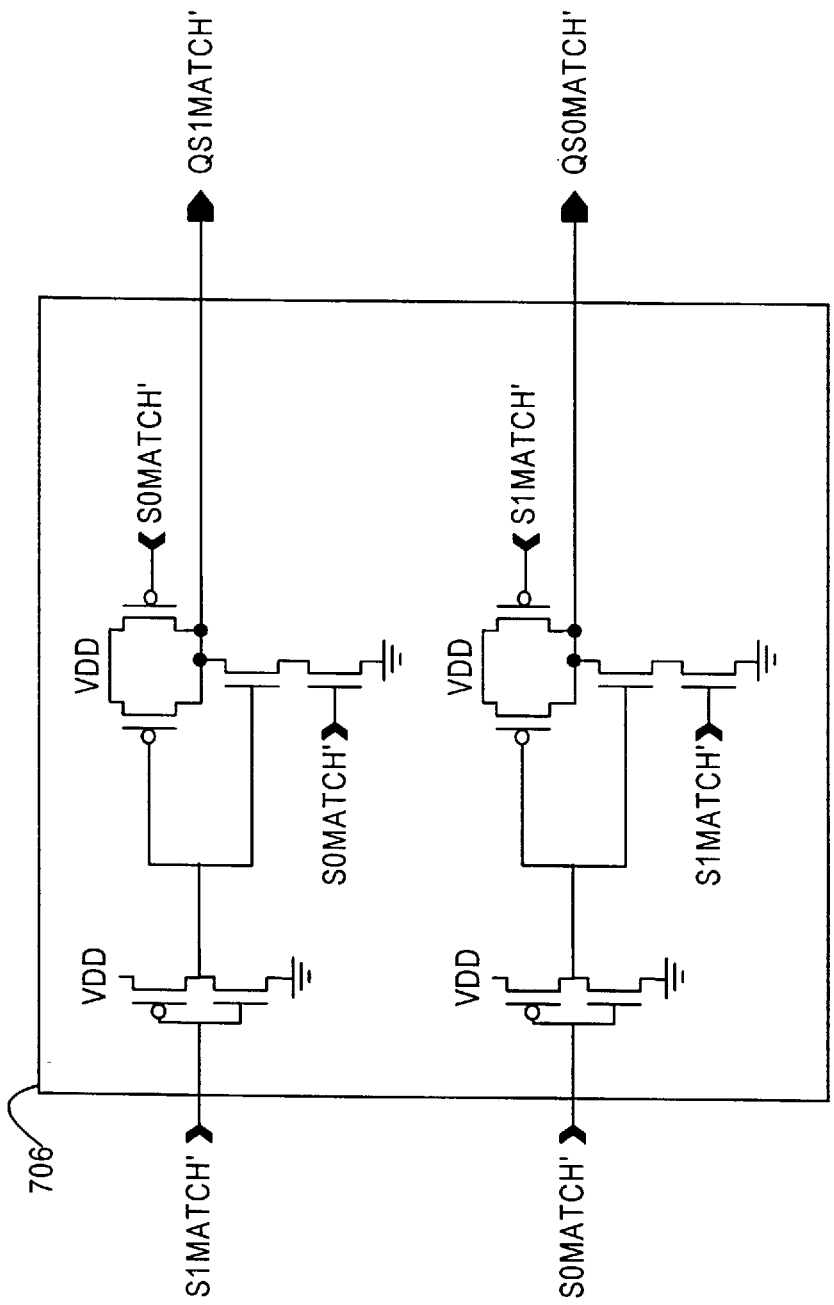
FIG. 8 is a schematic diagram of a tag match qualification circuit as used in the preferred embodiment of the present invention.

FIG. 8 shows a schematic diagram of the tag match signal qualifier circuit 706 of the preferred embodiment.

In the data array output selection path of the cache output selector 700 in FIG. 7, a qualified multiplexor circuit 716, 718 corresponding to each data array, each receive the qualified tag match signals QS0MATCH', QS1MATCH'. A data array select signal S0SEL, indicating which data array currently contains set 0, is also received by the qualified multiplexor circuits 716, 718. The qualified multiplexor circuits 716, 718, may each receive a different input signal (i.e., the qualified tag match signals QS0MATCH', QS1MATCH') on each respective data input than that received by the corresponding respective data input of each other qualified multiplexor circuit. This configuration allows the data array select signal S0SEL to be input directly without alteration into each qualified multiplexor circuit 716, 718. Such is the configuration of the qualified multiplexor circuits 716, 718 shown in FIG. 7. Thus, qualified tag match signal QS0MATCH' is received at a first data input of multiplexor circuit 718 and at a second data input of multiplexor circuit 716, and qualified tag match signal QS1MATCH' is received at a second data input of multiplexor circuit 718 and at a first input of multiplexor circuit 716. In the alternative, the qualified multiplexor circuits 716, 718, may each receive the same input signal (i.e., qualified tag match signals QS0MATCH', QS1MATCH') on each respective data input as that received by the corresponding respective data input of each other qualified multiplexor circuit. This configuration would require the data array select signal S0SEL to be manipulated to select a different data input for each qualified multiplexor circuit. For example, in a two-way set-associative cache memory, the data array select signal S0SEL could simply be inverted for one of the qualified multiplexor circuits 716, 718.

In addition to the qualified tag match signals QS0MATCH', QS1MATCH' received as data input to each qualified multiplexor circuit 716, 718, and the data array select signal S0SEL received as a selector signal, each qualified multiplexor circuit 716, 718 also receives a clock signal CK2, a non-overlapping clock signal CK1N, and a qualifier signal QUAL. The qualifier signal QUAL may serve several purposes, including a test mode signal as described previously. The clock signal CK2 and non-overlapping clock signal CK1N are system-wide available clock signals generated elsewhere in the microprocessor.

The qualified multiplexor circuit 716 produces the enable signal Q_ARRAY_20_ENABLE for output from data array 20. The qualified multiplexor circuit 718 produces the enable signal Q_ARRAY_10_ENABLE for output from data array 10.

Figure 9:
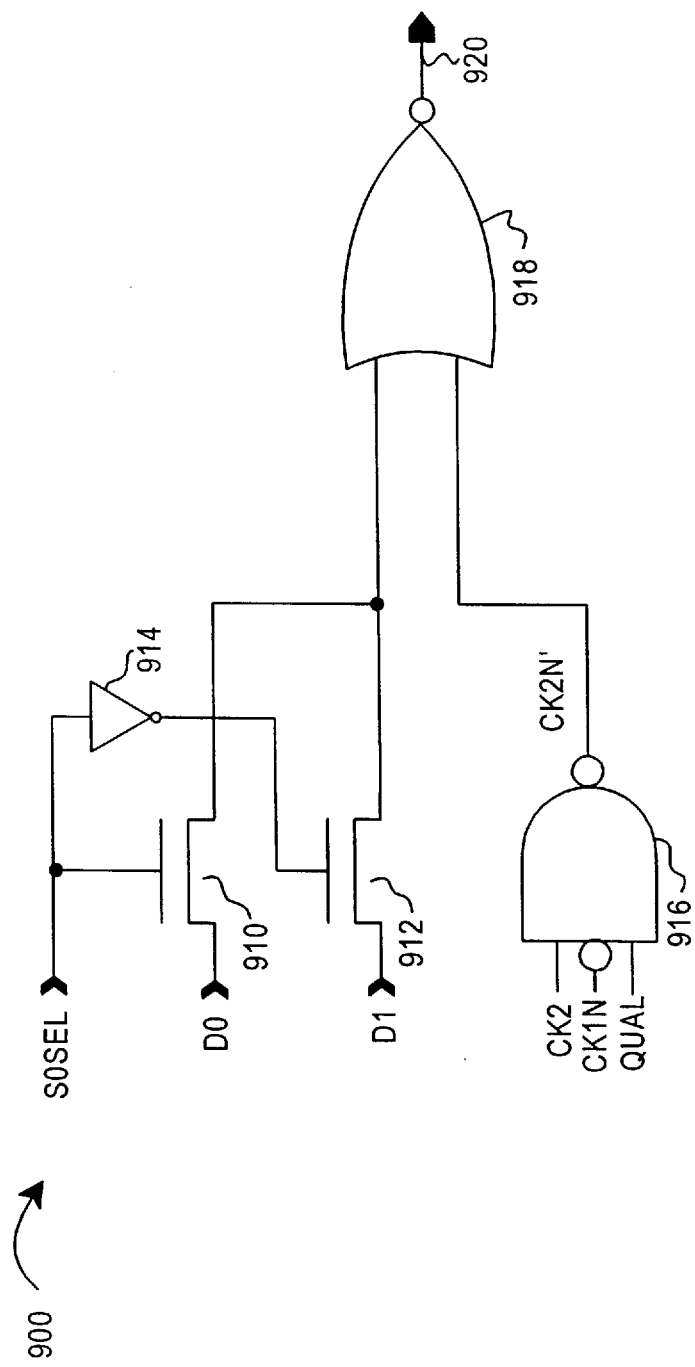
FIG. 9 is a logic diagram of a qualified multiplexor circuit in accordance with the principles of the present invention.

FIG. 9 is a logic diagram of a qualified multiplexor circuit 900 used in implementing qualified multiplexor circuits 716, 718 shown in FIG. 7. As shown in FIG. 9, the qualified multiplexor circuit 900 includes a first transfer gate 910 for receiving a first data input D0 and a second transfer gate 912 for receiving a second data input D1. In the preferred embodiment, the transfer gates are implemented with NMOS transistors. The first and second transfer gates 910, 912 are mutually exclusive in being either open or closed. Thus, if first transfer gate 910 is open, second transfer gate 912 is closed. Similarly, if first transfer gate 910 is closed, second transfer gate 912 is open. A select signal S0SEL is used to select which of first and second transfer gates 910 or 912 is open. In the preferred embodiment, the select signal S0SEL indicates which data array 10, 20 currently contains set 0. Furthermore, in the preferred embodiment one transfer gate 910 receives the select signal S0SEL and the other transfer gate 912 receives an inverted select signal S0SEL', generated by sending select signal S0SEL through an inverter 914.

The qualified multiplexor circuit 900 also includes a NAND gate 916 which receives the input clock signal CK2, the input non-overlapping clock signal CK1N, and the input qualifier signal QUAL. The input non-overlapping clock signal CK1N is inverted prior to performing a logical NAND on the inputs. The NAND gate 916 generates a non-overlapping clock signal CK2N'. When clock signal CK2 is high (in its evaluate phase) and non-overlapping clock signal CK1N is low (in its pre-charge phase), then the non-overlapping clock signal CK2N' may enter its evaluate phase, during which the qualified tag match signals QS0MATCH' and QS1MATCH' are valid.

The qualified multiplexor circuit 900 also includes a NOR gate 918. The NOR gate 918 receives the selected input data signal (D0 or D1, as selected by select signal S0SEL) and the non-overlapping clock signal CK2N', and produces a data array select signal 920. It will be appreciated that the qualified multiplexor circuit 900 of the present invention eliminates several levels of logic and reduces complexity by combining the multiplexor functionality with the clock qualifying functionality. As is apparent from the above description, the data array output selector path of the present invention employs only three levels of logic between the raw tag matches S0MATCH', S1MATCH' and the data array output select Q_ARRAY_10_ENABLE, Q_ARRAY_20_ENABLE. That is, the logic of the data array output selector path comprises NAND gates 708/710 in the tag match qualification circuit 706 in a first level of logic, followed by the qualifying multiplexor circuit QMUX 900 including NAND gate 916 in parallel with transfer gates 912/914 in a second level of logic, followed by NOR gate 918 in a third level of logic. This is compared to the logic of FIG. 6, which includes a circuit for generating the qualifier signal TAG_MATCH_VALID (at least one level of logic) followed by a NAND 608/610 level in the tag match qualification path, and a transfer gate followed by an inverter (to implement the multiplexor) followed by an AND gate 626/628 level between the raw tag matches and the data array output select. The qualified multiplexor circuit 900 of the present invention reduces the number of logic levels from at least five to three, thus greatly improving the speed of the cache output selector.

Figure 10:
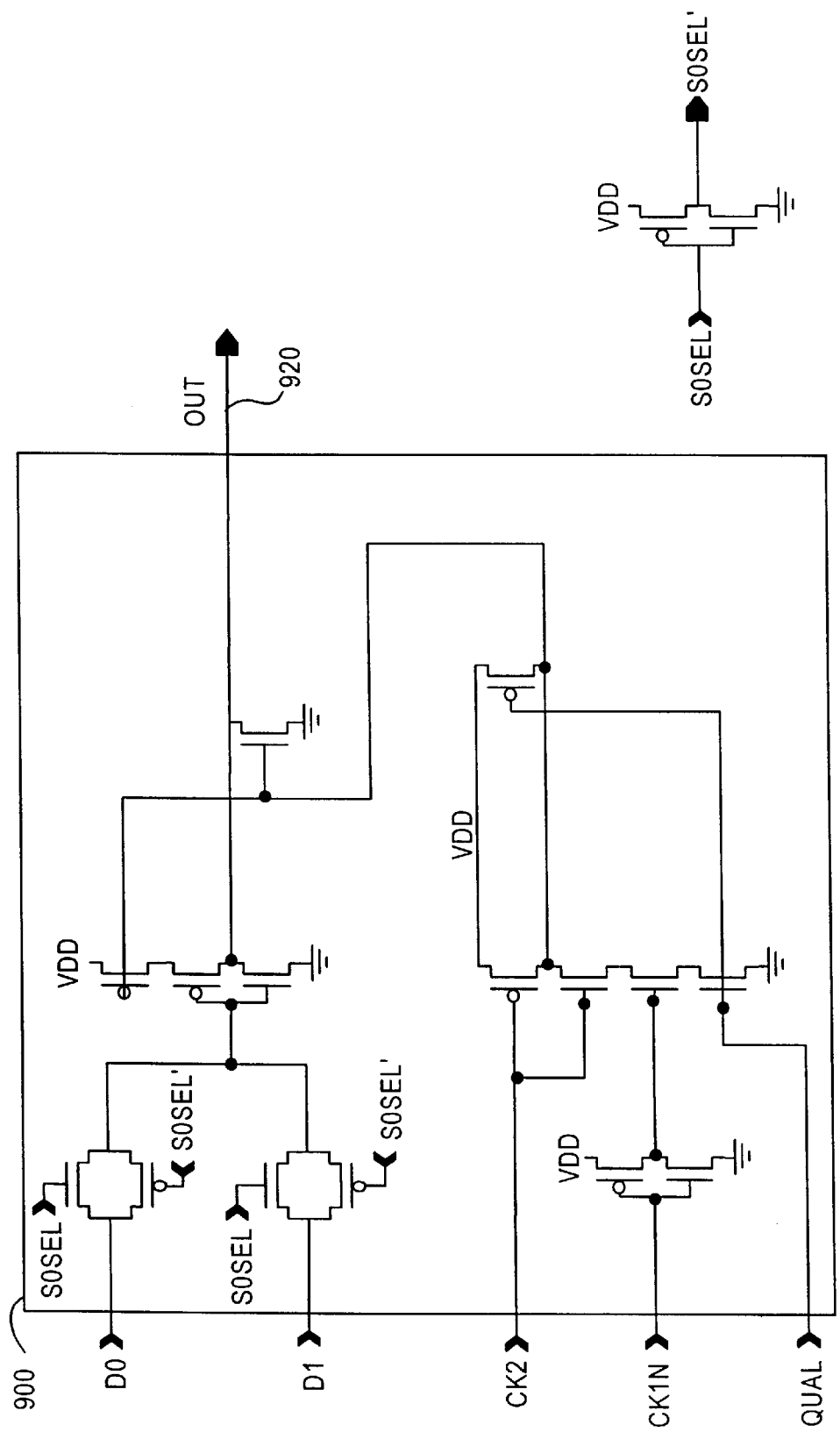
FIG. 10 is a schematic diagram of the qualified multiplexor circuit of FIG. 9.

FIG. 10 is a schematic diagram of an implementation of the qualified multiplexor circuits QMUX 716, 718 shown in FIG. 7 and 900 shown in FIG. 9.

As also shown in FIG. 7, the cache output selector 700 of the preferred embodiment of the present invention includes a pre-fetch buffer/bypass output path. The pre-fetch buffer/bypass output path includes a 3-input NAND gate 711 followed by a qualified NOR circuit QNOR 712 for selecting the bypass path for output, and a 3-input NAND gate 713 followed by a qualified NOR circuit QNOR 714 for selecting the pre-fetch buffer path for output. In the pre-fetch buffer/bypass output path, signal qualification using a non-overlapping clock signal is combined with a NOR function in each qualified NOR circuit QNOR 712, 714. The raw tag match signals S0MATCH' and S1MATCH' generated by respective tag comparison circuits 702 and 704 are received as data inputs by respective NAND gates 711, 713.

Each NAND gate 711, 713 receives a bypass/pre-fetch select signal BP/PFB', which indicates which path, bypass or pre-fetch, should be selected for output. The bypass/pre-fetch buffer signal BP/PFB' is generated by a bypass/pre-fetch select circuit 740. The bypass/pre-fetch buffer signal BP/PFB' in the preferred embodiment is high (logical 1) when the bypass path is selected and is low (logical 0) when the pre-fetch buffer path is selected. The bypass/pre-fetch select circuit 740 defaults to selecting the pre-fetch buffer path (i.e., bypass/pre-fetch buffer signal BP/PFB' is low) unless it detects that the requested data is currently being written to a pre-fetch buffer during a cycle in which it is requested to be read.

The output of NAND gates 711, 713, BP_ENABLE, PFB_ENABLE are respectively received as a data input to qualifying NOR circuits 712, 714. The qualifying NOR circuits 712, 714 each also receive a qualifier signal QUAL. Each qualified NOR circuit 712, 714 also receives a clock signal CK2 and a non-overlapping clock signal CK1N. The clock signal CK2 and non-overlapping clock signal CK1N are system-wide available clock signals generated elsewhere in the microprocessor, and are used to qualify the output of the qualified NOR circuits QNOR 712, 714, Q_BP_ENABLE and Q_PFB_ENABLE, to eliminate signal races in the output select signal.

Figure 11:
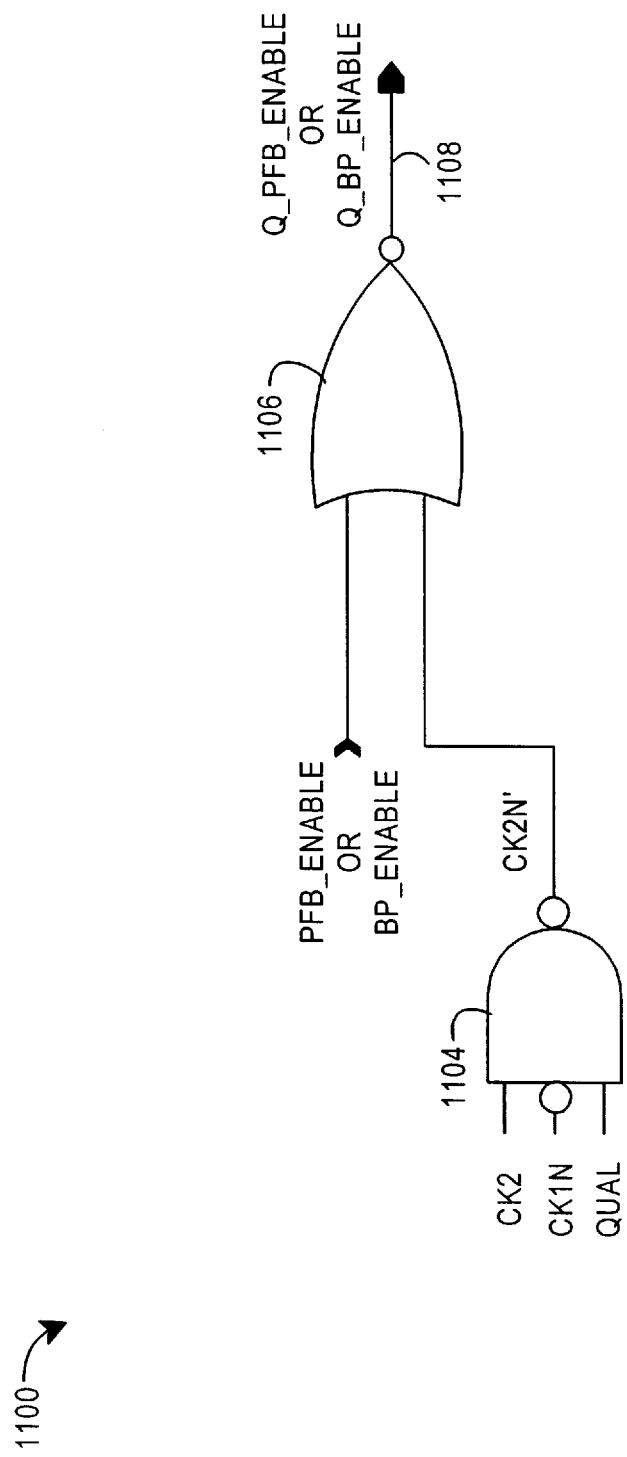
FIG. 11 is a logic diagram of a qualified NOR circuit in accordance with the principles of the present invention.

FIG. 11 is a logic diagram of a qualified NOR circuit QNOR 1100 used in implementing qualified NOR circuits QNOR 712, 714 shown in FIG. 7. As shown in FIG. 11, the qualified NOR circuit QNOR 1200 includes a 3-input NAND gate 1104 which receives the input clock signal CK2 and input non-overlapping clock signal CK1N and the qualifier signal QUAL. The input non-overlapping clock signal CK1N is inverted prior to performing a logical NAND on the inputs. The NAND gate 1104 generates a non-overlapping clock signal CK2N'.

The qualified NOR circuit QNOR 1100 also includes a NOR gate 1106. The NOR gate 1106 receives a data input PFB_ENABLE or BP_ENABLE and the non-overlapping clock signal CK2N', and produces a qualified output select signal 1108, Q_PFB_ENABLE or Q_BP_ENABLE. It will be appreciated by one skilled in the art that NAND gates 711, 713 are in essence parallel to NAND gate 1104 of FIG. 11 and constitute the same level of logic. Thus, it will be appreciated that the pre-fetch buffer/bypass output select path of the present invention eliminates three levels of logic by combining the NOR functionality with the clock qualifying functionality. As is apparent from the above description, the pre-fetch buffer/bypass path of the present invention employs only two levels of logic between the raw tag matches S0MATCH', S1MATCH' and the bypass/pre-fetch output select Q_BP_ENABLE, Q_PFB_ENABLE. A first level of logic includes NAND gates (NAND gates 711, 713 in parallel with their respective NAND gates 1104 used to implement qualified QNOR circuits 712, 714), and the second level of logic includes respective NOR gates 1106 in the respective qualified NOR circuits QNOR 712, 714. This is compared to at least five levels of logic required in FIG. 6, which includes the circuit for generating qualifier signal TAG_MATCH_VALID (at least one level of logic) followed by a NAND 608/610 level in the tag match qualification path, and a NOR gate 616 logic level (two levels of logic) followed by a NAND gate 618/620 level followed by an AND gate 622/624 level between the raw tag matches and the data array output select. The pre-fetch buffer/bypass output select path of the present invention reduces the number of logic levels from five to two, thus greatly improving the speed of the cache output selector.

Figure 12:
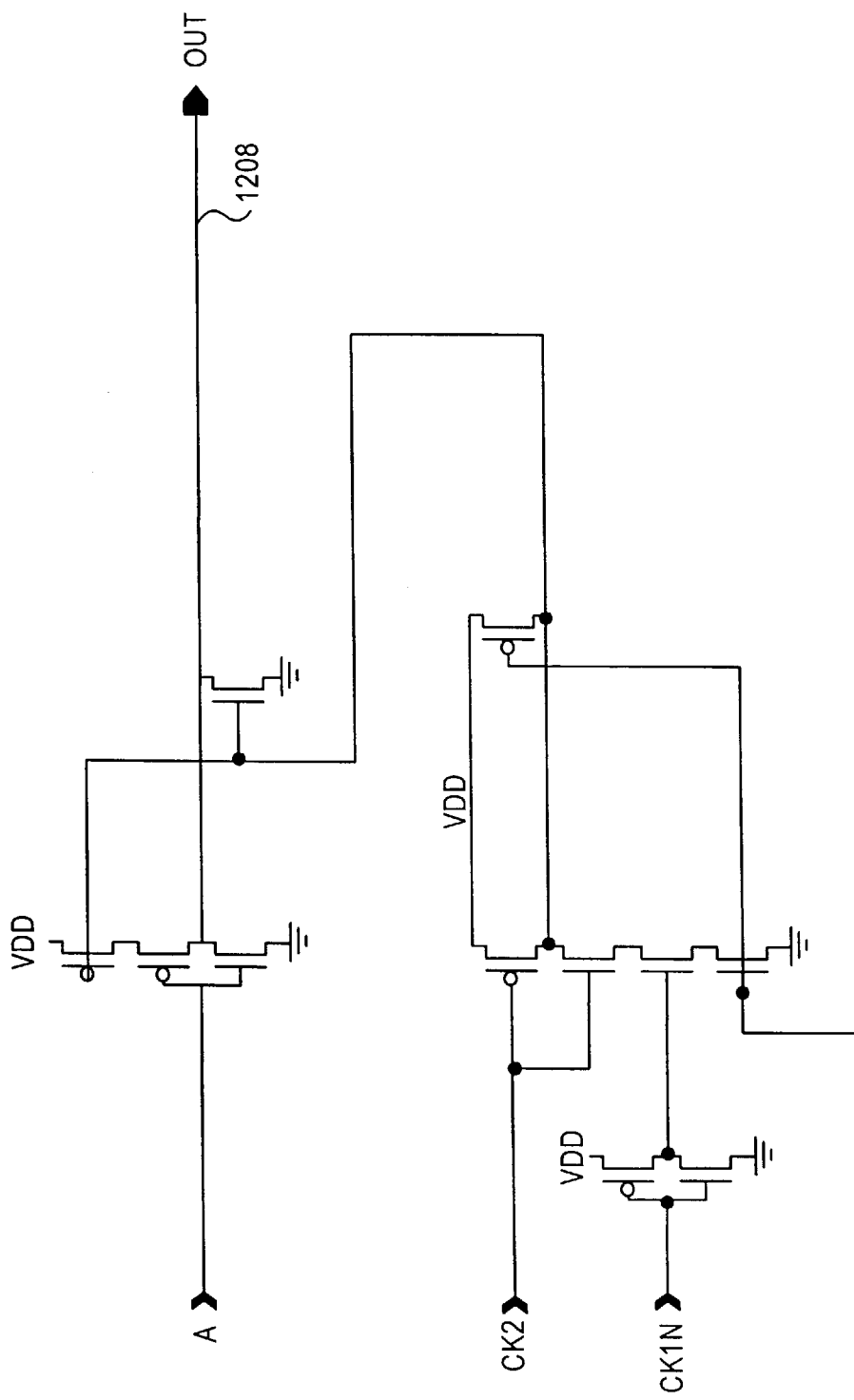
FIG. 12 is a schematic diagram of the qualified NOR circuit of FIG. 11.

FIG. 12 is a schematic diagram of an implementation of the qualified NOR circuits QNOR 712, 714 shown in FIG. 7 and 1100 shown in FIG. 11.

It will be appreciated from FIG. 7 that the cache output selector 700 of the present invention is also implemented to maintain the same timing between the falling edge of first clock signal CK1N and the rising edge of the qualified enable signals Q_ARRAY_10_ENABLE, Q_ARRAY_20_ENABLE, Q_PFB_ENABLE, Q_BP_ENABLE, and between the falling edge of second clock signal CK2 and the falling edge of the qualified enable signals as that shown in FIG. 6. As shown in FIG. 6, AND gates 622–628 each receive first and second clock signals CK1N, CK2 to guarantee that the output enable signals Q_ARRAY_10_ENABLE, Q_ARRAY_20_ENABLE, Q_PFB_ENABLE, and Q_BP_ENABLE do not go true until each of the signals from the upstream latches are stable and guaranteed not to raise. This avoids signal races between upstream and downstream latches and therefore invalid true output enable signals. As shown in FIG. 7, each of the qualifying multiplexors QMUX 716, 718 and qualifying QNOR circuits 712, 714 receive the first and second clock signals CK1N, CK2 in parallel to also prevent signal races between upstream latches. Thus, the implementations in FIG. 6 and FIG. 7 both utilize one level of clock qualification which allows the timing for downstream latches to remain the same.

Figure 13:
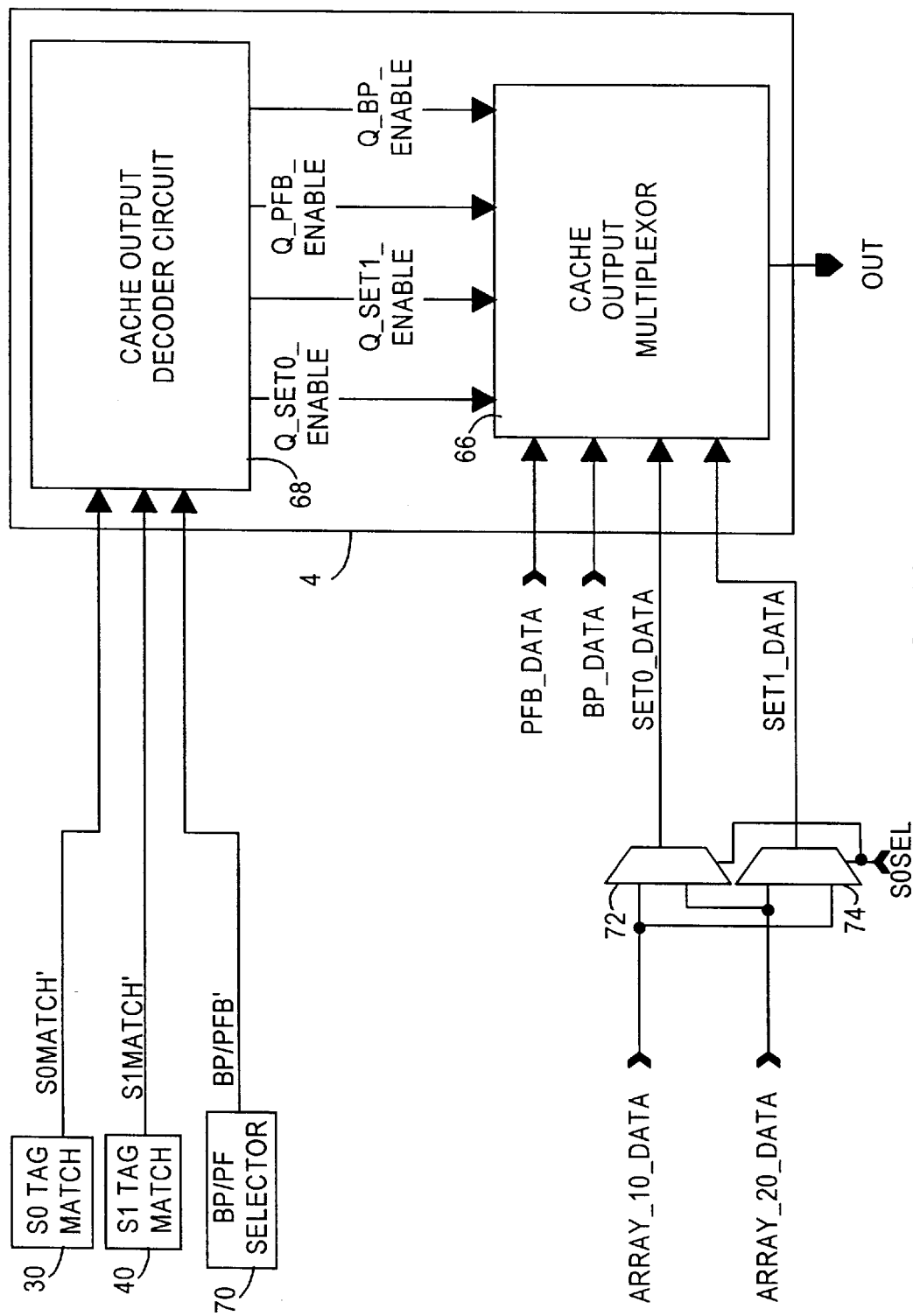
FIG. 13 is a logic diagram of an alternative embodiment of a cache output selector of the present invention.

FIG. 13 is a block diagram of an alternative embodiment of the cache output selector 4 of the present invention. As shown in FIG. 5, the cache output selector 4 receives a set of double-word inputs PFB_DATA, BP_DATA, SET0_DATA, SET1_DATA. Each bit of the respective inputs PFB_DATA, BP_DATA are generated respectively by the plurality of pre-fetch buffer bit output decoders 60 and the bypass path 13. The data inputs are received by a cache output multiplexor/latch 66 within the cache output selector 4. FIG. 13 is identical to the embodiment shown in FIG. 5, but includes an additional pair of multiplexors 72, 74 in the data array output path. The multiplexors 72, 74 each receive the cross-coupled output signals ARRAY_10_DATA, ARRAY_20_DATA of data array output multiplexors 62, 64 from FIG. 4. Each multiplexor 72, 74 also receives a selector signal SOSEL which indicates which data array 10, 20 currently contains set 0, and consequently which data array 20, 10 currently contains set 1. Each multiplexor 72, 74 respectively drives the output of set 0 and set 1, produces respective outputs SET0_DATA, SET1_DATA. A cache output multiplexor/latch 66 within the cache output selector 4 receives data inputs PFB_DATA, BP_DATA, SET0_DATA, SET1_DATA. The cache output multiplexor/latch 66 also receives several select inputs, Q_SET0_ENABLE, Q_SET1_ENABLE, Q_PFB_ENABLE, Q_BP_ENABLE, from which the cache output multiplexor determines which of the data inputs should be selected for output. Select inputs Q_PFB_ENABLE and Q_BP_ENABLE are generated by the QNOR circuits 712, 714 in the preferred embodiment as shown at 1100 in FIGS. 11 and 12. The select inputs Q_SET0_ENABLE, Q_SET1_ENABLE are generated in the cache output decoder circuit using the implementation shown in the preferred embodiment 700 of FIG. 7. However, an alternative embodiment for QMUX circuits 716, 718, shown at 1400 in FIG. 14, is used to generate the select inputs Q_SET0_ENABLE, Q_SET1_ENABLE.

Figure 14:
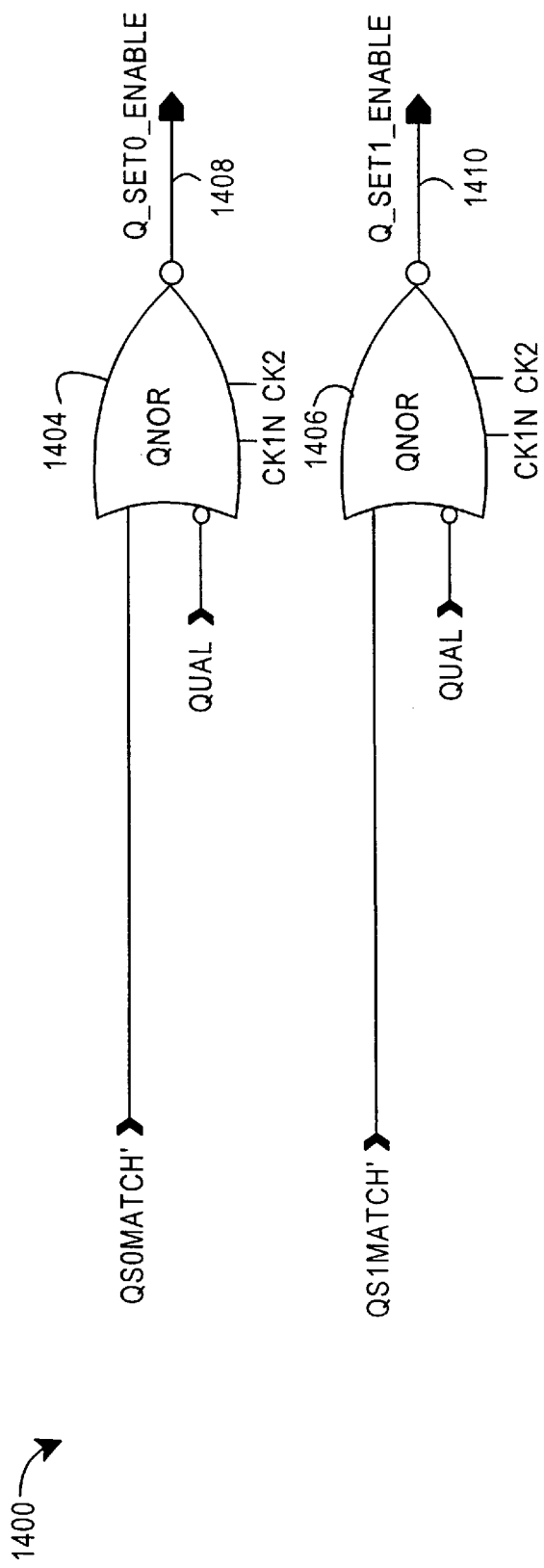
FIG. 14 is a logic schematic of an alternative embodiment of a qualified multiplexor circuit for use in the cache output selector of FIG. 13.

FIG. 14 is a logic diagram of the alternative embodiment of a qualified multiplexor circuit 1400 used in implementing qualified multiplexor circuits 716, 718 shown in FIG. 7. As shown in FIG. 14, the qualified multiplexor circuit 1400 includes a first qualified NOR gate QNOR 1404 and a second qualified NOR gate QNOR 1406. Each of first and second qualified NOR gates QNOR 1404, 1406 receive respective qualified tag match signal inputs QS0MATCH', QS1MATCH' at their respective data inputs. Each of first and second NOR gates 1404, 1406 also receive a qualifier signal QUAL at their respective qualifying inputs. Each of the qualified NOR circuits QNOR 1404, 1406 may be implemented as shown in FIGS. 11 and 12. The first qualified NOR gate QNOR 1404 produces a select signal Q_SET0_ENABLE 1408 if set 0 hit. The second qualified NOR gate QNOR 1406 produces a select signal Q_SET1_ENABLE 1408 if set 1 hit.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A cache output selector for a multi-way set-associative cache memory, said cache memory for storing a plurality of lines of data, each line data containing a plurality of words of data, and for providing for simultaneous access of words grouped as a multiple-word, said cache memory comprising a plurality of data arrays wherein consecutive multiple-words of each line of data in the plurality of lines of data reside in different data arrays in the plurality of data arrays, said cache memory comprising a switchably selectable output path for outputting an addressed multiple-word either via a pre-fetch buffer path from a set of pre-fetch latches or via a bypass path which bypasses said set of pre-fetch latches said cache output selector comprising:

for each data array of the plurality of data arrays, a tag matching circuit for checking whether an addressed multiple-word resides in the data array and for producing a tag match signal to indicate whether the addressed multiple-word resides in the data array;

a qualifying tag match circuit which receives the respective tag match signals from each of the tag matching circuits and produces respective qualified tag match signals for each of the tag matching signals;

for each data array of the plurality of data arrays, a qualifying multiplexor which receives the respective qualified tag match signals from the qualifying tag matching circuit as data inputs, a set selector signal which selects one of said data inputs for output, and at least one qualifying signal used to qualify when said qualifying multiplexor outputs said selected data input as a qualified data array output enable signal; and a qualifying output path select circuit which receives said respective tag match signals from each of said tag matching circuits as data input, said at least one qualifying signal as a qualifying input, and an output path select signal as a select input, said qualifying output path select circuit selecting one of said prefetch path or said bypass path from which to output said addressed multiple-word and qualifying an output enable signal.

2. The cache output selector of claim 1, said qualifying tag match circuit comprising a plurality of NAND gates, one each corresponding to each tag match signal and each receiving all of the plurality of tag match signals and wherein the tag match signal corresponding to the NAND gate is inverted before input to the NAND gate, and each NAND gate producing a respective qualified tag match signal of its corresponding tag match signal.

3. The cache output selector of claim 1, said at least one qualifying signal comprising:
   a first clock signal; and
   a second clock signal.

4. The cache output selector of claim 1, said qualifying multiplexor comprising two levels of logic.

5. The cache output selector of claim 1 said qualifying multiplexor comprising:
   a plurality of transfer gates, one each corresponding to each qualifified tag match signal, each transfer gate having a transfer gate input to receive an input signal, a transfer gate output to produce an output signal, and a transfer gate control means to control whether the input signal received at the transfer gate input is transferred to the transfer gate output, and wherein each transfer gate receives its corresponding qualified tag match signal as its input signal;
   a selector means responsive to the set selector signal for selecting one selected transfer gate from the plurality of transfer gates, signaling the transfer gate control means of the selected transfer gate to transfer its input signal to its transfer gate output to produce a selected transfer signal;
   a NAND gate connected to receive said at least one qualifying signal and to produce a NAND gate output signal; and
   a NOR gate connected to receive the selected transfer signal and the NAND gate output signal, which produces said qualified data array output enable signal.

6. The cache output selector of claim 1, said qualifying multiplexor comprising:
   a NAND gate connected to receive said at least one qualifying signal and to produce a NAND gate output signal; and
   a plurality of NOR gates, one each corresponding to each qualified tag match signal, each NOR gate connected to receive its respective qualified tag match signal and the NAND gate output signal, and each producing a qualified data array output enable signal.

7. The cache output selector of claim 1 said qualifying output path select circuit comprising:
   a NAND gate which receives said output path select signal and each of the respective tag match signals from each of the tag matching circuits and produces an output path NAND output signal;
   a qualifying NOR gate which receives the output path NAND output signal and said at least one qualifying signal, wherein said qualifying NOR gate combines a clock qualifying functionality and a logical NOR functionality to produce a qualified output select path enable signal.

8. The cache output selector of claim 7, said qualifying NOR gate comprising a speed-critical enable path of one level of logic.

9. The cache output selector of claim 7, said qualifying NOR gate comprising:
   a NAND gate connected to receive said at least one qualifying signal, which produces a NAND gate output signal; and
   a NOR gate connected to receive the output select path enable signal and the NAND gate output signal, which produces a qualified output select path enable signal.

10. The cache output selector of claim 7, said prefetch buffer path comprising:
    a plurality of prefetch buffers, each for storing a multiple-word, and
    a prefetch buffer multiplexor connected to receive the contents of each of the plurality of prefetch buffers, for selecting and outputting the contents of one of the plurality of prefetch buffers.

11. The cache output selector of claim 1, said output path select signal comprising a prefetch buffer path select signal and a bypass path select signal, said output path enable signal comprising a prefetch buffer path output enable signal and a bypass path output enable signal, said qualifying output path select circuit comprising:
    a first NAND gate connected to receive each of the respective tag match signals from each of the tag matching circuits and said prefetch buffer path select signal, and which produces a prefetch buffer path NAND output signal;
    a first qualifying NOR gate connected to receive the prefetch buffer path NAND output signal and said at least one qualifying signal, which produces said qualified prefetch buffer path output enable signal;
    a second NAND gate connected to receive each of the respective tag match signals from each of the tag matching circuits and said bypass path select signal, and which produces a bypass path NAND output signal;
    a second qualifying NOR gate connected to receive the bypass path NAND output signal and said at least one qualifying signal, which produces said qualified bypass path output enable signal;
    wherein said first qualifying NOR gate and said second qualifying NOR gate each combine a clock qualifying functionality and a logical NOR functionality to produce said qualified prefetch buffer path output enable signal and said qualified bypass path output enable signal.

12. The cache output selector of claim 11, wherein:
    said first qualifying NOR gate comprises:
       a third NAND gate connected to receive said at least one qualifying signal, which produces a third NAND gate output signal; and
       a first NOR gate connected to receive the prefetch buffer path output enable signal and the third NAND gate output signal, which produces said qualified prefetch buffer path output enable signal; and
    said second qualifying NOR gate comprises:
       a fourth NAND gate connected to receive said at least one qualifying signal, which produces a fourth NAND gate output signal; and
       a second NOR gate connected to receive the bypass path output enable signal and the fourth NAND gate output signal, which produces said qualified prefetch buffer path output enable signal.

13. The cache output selector of claim 11, said prefetch buffer path comprising a plurality of prefetch buffers, each for storing a multiple-word, and
    a prefetch buffer multiplexor having a plurality of inputs connected to receive the contents of each of the plurality of prefetch buffers, a selection input responsive to a selection signal for selecting a selected input from among the plurality of inputs, and a prefetch buffer multiplexor output upon which the selected input is produced as data for the prefetch buffer path.

14. The cache output selector of claim 11, said bypass path comprising a direct bypass line from the input of the prefetch buffer path from which the addressed multiple-word may be selected for output from the cache memory by the cache output selector.

15. A qualifying multiplexor circuit comprising:

a plurality of transfer gates, each coupled to receive a data input signal and each comprising a transfer gate control means for controlling whether its respective data input signal is output as a transfer gate output;

a selector means responsive to a selector signal for selecting one of said plurality of transfer gates and causing said transfer gate control means of said selected transfer gate to transfer its data input signal to its respective transfer gate to produce a selected transfer signal;

a NAND gate connected to receive at least one qualifying signal and which produces a NAND gate output signal; and a NOR gate connected to receive the selected transfer signal and the NAND gate output signal, which produces the qualified multiplexor output signal.

16. The qualifying multiplexor circuit of claim 15, said at least one qualifying signal comprising:

a first clock signal, a second clock signal, and a qualifier signal.

17. A qualifying NOR circuit, comprising:

a plurality of data inputs, a first clock signal input, a second clock signal input, and a qualifier signal input, said qualifying NOR circuit combining a clock qualifying functionality and a logical NOR functionality to produce a qualified NOR output signal.

18. The qualifying NOR circuit of claim 17, comprising:

a NAND gate connected to receive the first clock signal, the second clock signal, and the qualifier signal, which produces a NAND gate output signal; and a NOR gate connected to receive the plurality of data input signals and the NAND gate output signal, which produces the qualified NOR output signal.

* * * * *

UNITED STATES PATENT AND TRADEMARK OFFICE
CERTIFICATE OF CORRECTION

PATENT NO. : 5,854,943  Page 1 of 1
DATED : December 29, 1998
INVENTOR(S) : John G. McBride et al.

It is certified that error appears in the above-identified patent and that said Letters Patent is hereby corrected as shown below:

<u>Column 16,</u>
Line 27, delete " line data" and insert therefor -- line of data --

<u>Column 19,</u>
Line 13, delete " gate to" and insert therefor -- gate output to --

Signed and Sealed this

Eleventh Day of June, 2002

Attest:

JAMES E. ROGAN
Attesting Officer    Director of the United States Patent and Trademark Office